Nov. 2, 1926. 1,605,747
L. D. MAGNESS
BRAKE
Filed Jan. 12, 1925
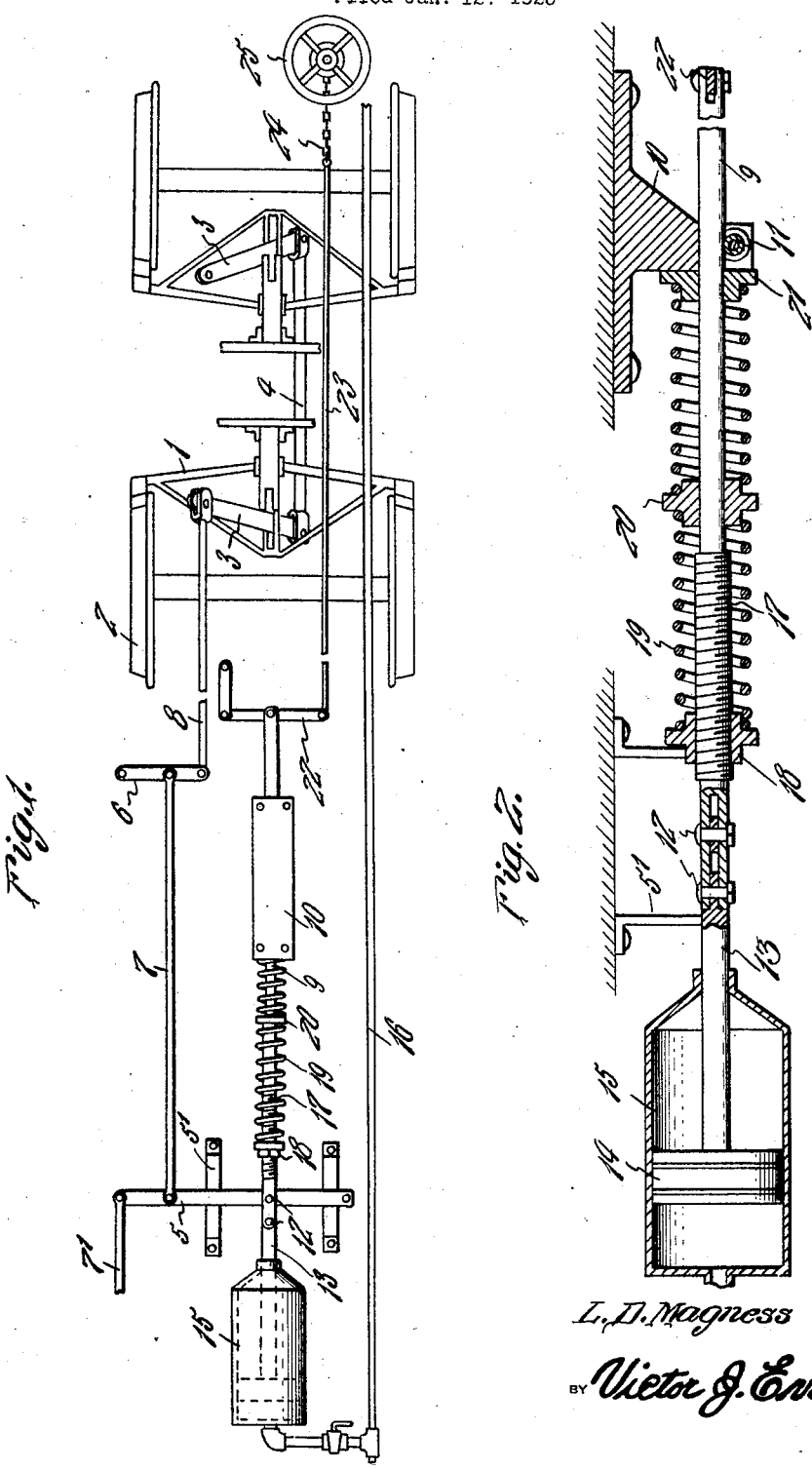
L. D. Magness
INVENTOR
BY Victor J. Evans
ATTORNEY Patented Nov. 2, 1926.

1,605,747

UNITED STATES PATENT OFFICE.

LYLE D. MAGNESS, OF CHILOQUIN, OREGON.

BRAKE.

Application filed January 12, 1925. Serial No. 2,002.

This invention relates to brakes for railroad cars and the like, the general object of the invention being to provide spring means for applying the brakes and hand operated means for removing the brakes.

Another object of the invention is to provide means operated by compressed fluid for releasing the brakes.

A further object of the invention is to provide means for adjusting the spring means to regulate the pressure of the brakes upon the wheels.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic plan view showing the invention in use.

Figure 2 is a vertical sectional view through the cylinder and spring means.

In these views, 1 indicates the brake beams which carry the brake shoes for engaging the wheels 2 of the vehicle, these beams being movable through the usual means which include the main brake levers 3 which are connected together by the link 4, and the operated lever 5 and pivoted lever 6 which are connected together by the link 7, the main brake lever 6 being connected with the lever 3 by the link 8. Said operated lever 5 is also connected with the brake means at the other end of the car by the link 7'. Said lever 5 is supported by the hangers 5'. A rod 9 is slidably supported by a hanger 10 fastened to the bottom of the car and which carries a roller 11 upon which the rod rests. The other end of the rod is forked to receive the lever 5 which is pivoted thereto, as shown at 12, and the extremities of the prongs are pivoted to a piston rod 13 of a piston 14 which is arranged in the air cylinder 15 which is connected with the air line 16 of the train. The rod 9 is provided with an enlarged threaded part 17 which is engaged by a flanged nut 18. Coil springs 19 are arranged on the rod and these springs are adapted to act upon the nut 18 and the hanger to force the rod 9 to the left in Figures 1 and 2 and thus rock the operated lever 5 to cause it to move the brake parts to press the shoes against the wheels. While but a single spring can be used I prefer to use a number of springs, the adjacent ends of the springs engaging a flanged collar 20 which is slidably mounted on the rod 9 and to locate a washer 21 on the rod which bears against the hanger 10 and is engaged by the outer end of the front end of the front spring. The front end of the rod 9 is pivoted to a lever 22 to which is connected a rod 23 which is in turn connected by a chain 24 with the shaft of the hand wheel 25. By moving the nut 18 on the shaft 9 the tension of the springs means can be regulated to cause the shoes to engage the wheels with the desired amount of pressure.

From the foregoing it will be seen that the spring means tend to hold the brake shoes against the wheels. When it is desired to release the brakes by hand, the hand wheel 25 is manipulated to cause the lever 22 to move the rod 9 to the right in Figures 1 and 2, thus compressing the springs and moving the lever 9 to cause it to actuate the brake parts to remove the shoes from the wheels. As soon as the hand device 25 is released the springs 19 will return the parts to normal position with the shoes against the wheels. By admitting compressed air to the cylinder 15 the parts are moved to a position to release the brakes. The main use of the hand brake is to move cars when they are not attached to a train. The air brake is used when the car is attached to an engine. By regulating the amount of air entering the cylinder the engineer can cause the shoes to engage the wheels with just the right amount of pressure and if an air hose or a pipe should burst the brakes would be applied by the spring means and there is no danger of the brakes being released through leakage of the air as there is with an automatic air brake. Also in case of an air pump failure the brakes will be applied, for, as soon as the air pressure is reduced in the cylinder, the springs will act to apply the brakes. It will therefore be seen that my improvement has many advantages over the air brakes now in use.

While the drawings show the device being operated by compressed air and by hand it will of course be understood that the device can be operated by liquid means which are used instead of the cylinder and may consist of a motor or magnets.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

Brake operating mechanism including a hanger, a roller operated thereby, a rod slidably supported by the roller, an enlarged threaded portion intermediate the ends of the rod, a flange adjusting nut on the threaded portion, a flange collar slidably mounted upon the rod at the inner end of the threaded portion, a coil spring disposed between the collar and the hanger and a second coil spring disposed between the collar and the flange nut, a piston connected with one end of the rod and means forming pivotal connection between the rod and the brake mechanism.

In testimony whereof I affix my signature.

LYLE D. MAGNESS.